Jan. 4, 1949.  O. R. NEMETH  2,457,913
FILM GATE
Filed May 22, 1944  2 Sheets-Sheet 1
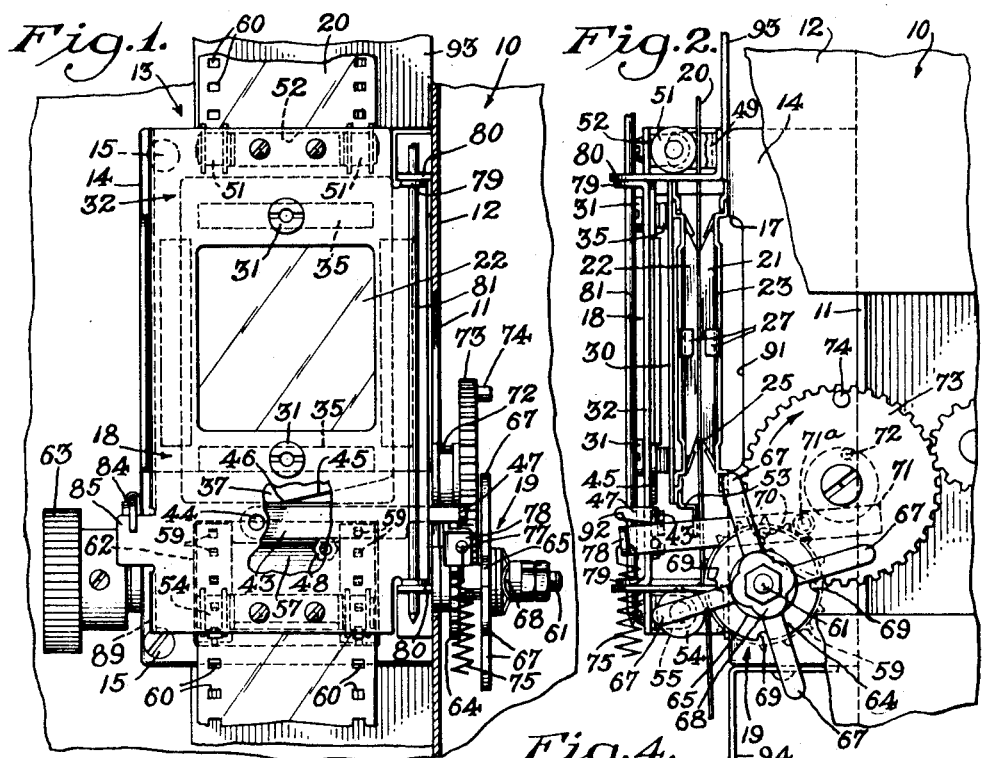
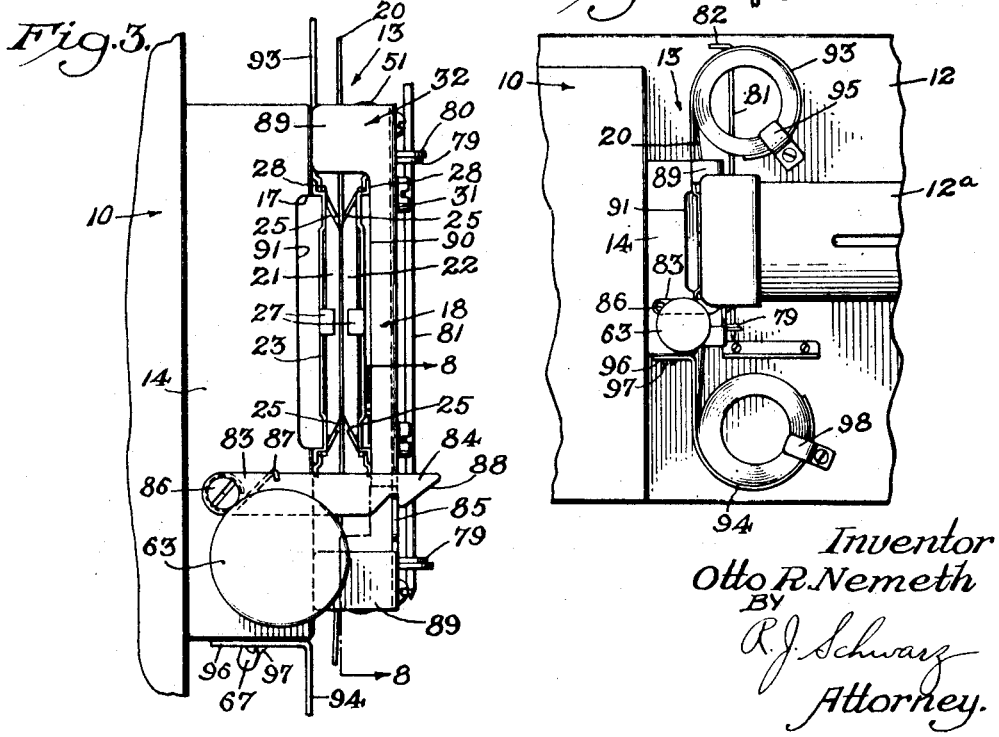
Inventor
Otto R. Nemeth
BY
R. J. Schwarz
Attorney.

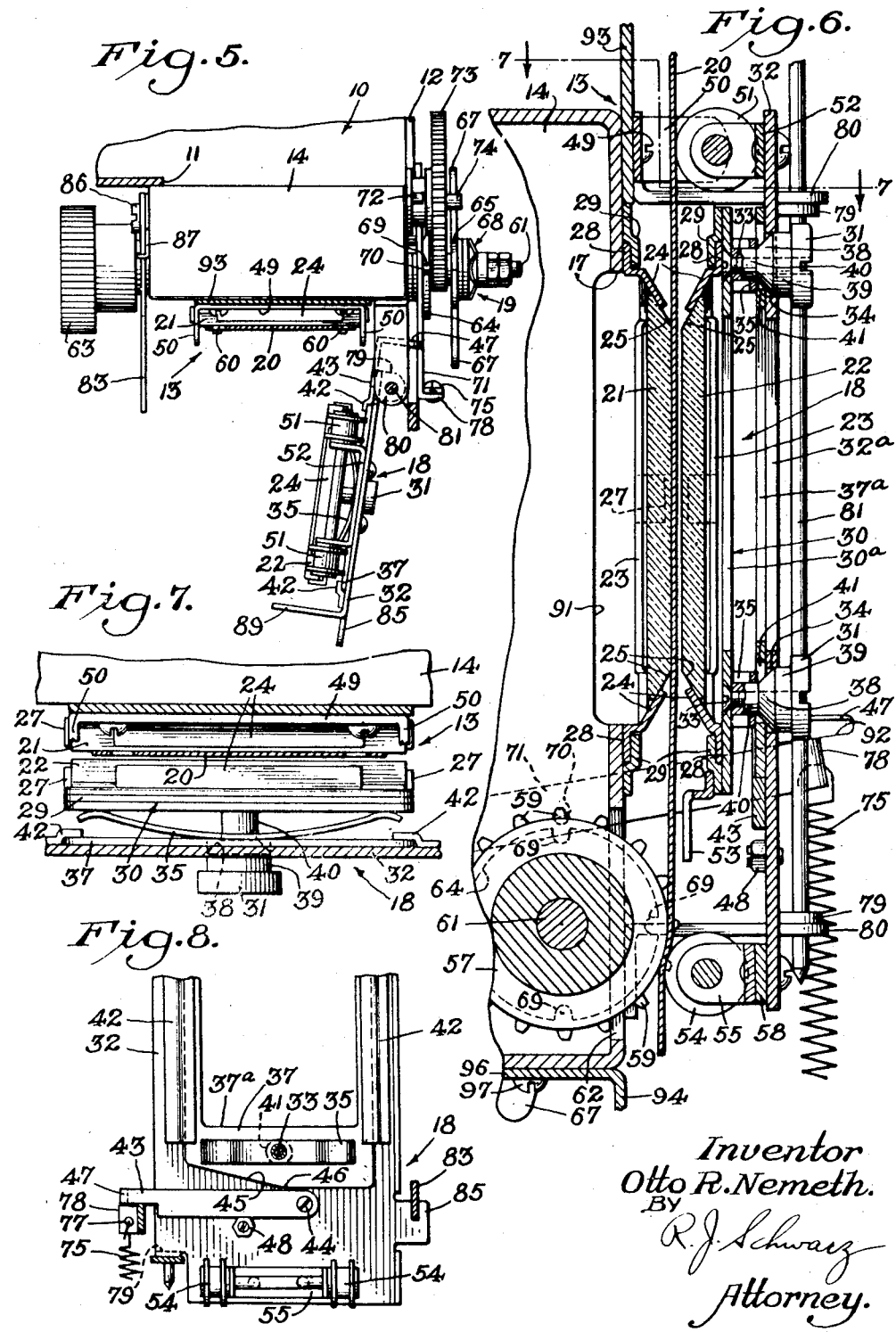

Patented Jan. 4, 1949

2,457,913

UNITED STATES PATENT OFFICE 2,457,913

FILM GATE

Otto R. Nemeth, Chicago, Ill.

Application May 22, 1944, Serial No. 536,720

13 Claims. (Cl. 88—28)

This invention relates to improvements in film gates and more particularly to such gates for strip film projectors.

In a strip film projector, that is a projection machine wherein a uniform series of individual picture images or frames is contained upon a strip of film adapted to be advanced intermittently one framed image at a time at the will of the operator for projection upon a screen, one of the problems has always been to maintain the film strip stationary, flat and free from buckling and in the proper plane during projection. In some prior projectors, the film is gripped between constant pressure devices through which the film is advanced by a substantial pull which must necessarily be exerted to overcome the frictional resistance of the grippers. Two major objections to this sort of arrangement are that the film in being pulled through the grippers is liable to be scratched, especially on the emulsion side, due to the constant engagement of the grippers; and the force required to pull the film through the gate places unusual and concentrated strain upon the sprocket holes, thus causing them to become prematurely worn or torn and unduly shortening the life of the film because the framed images will no longer properly register with the projection axis of the projector and must therefore be discarded.

Another and better arrangement consists in gripping the film strip between opposed members such as glass plates which are separable to release the film for advancement through the gate. Prior constructions of this character have been excessively bulky, complex in structure and operation and have sometimes also been unreliable due to rapid wearing out of critical bearing parts, thus necessitating excessive servicing to maintain the machines in adjustment.

An important object of the present invention is to provide an improved releasable gripper type of film gate structure for a strip film projector in which intermittent release of the film is accomplished in an exceptionally facile and efficient manner through the use of novel mechanism which is simple and exceptionally compact in form, may be manufactured at low cost and is highly reliable in operation.

Another object is to provide novel film gripper releasing means in the film gate of a strip film projector.

Another object of the invention is to provide for reliable, positive co-operation of structure and co-ordination in operation of the separable film gripping elements of the film gate and the film advancing mechanism of the projector.

A further object is to provide for improved film gate structure which simplifies threading of the film strip into place when loading the projector.

An additional purpose of the invention is to provide an easily assembled relationship of film gate and film advancing structures particularly adapted to co-operate in a compact sub-assembly that can be handled and mounted in the projector as a self-contained unit.

Other objects, features and advantages of the invention will be apparent from the following description, and by reference to the accompanying two sheets of drawings in which:

Figure 1 is a fragmentary view of a strip film projector showing in front elevation a film gate and associated intermittent film-advancing mechanism incorporating the features of the invention.

Fig. 2 is a right side elevational view of the film gate showing more or less diagrammatically certain details of the film-advancing mechanism.

Fig. 3 is a left side elevational view of the film gate.

Fig. 4 is a small scale fragmentary side elevational view of the projector particularly intended to show the film magazine construction.

Fig. 5 is a top plan view of the film gate showing the door open for threading a film strip into place.

Fig. 6 is an enlarged vertical sectional view taken in a front to rear plane along substantially the vertical center of the film gate and looking from the left side showing the film gate plates in separated relation.

Fig. 7 is a horizontal detail view, partially in section, taken substantially along the line 7—7 of Fig. 6.

Fig. 8 is a vertical sectional detail view taken substantially in the plane of line 8—8 of Fig. 3.

Only a fragmentary portion of a strip film projector has been illustrated, including structure in the projection zone thereof and embodying the features of the invention. This comprises a housing 10, (Figs. 1, 2 and 4) providing a projection opening 11 and including a vertical forwardly projecting wall panel 12 supporting the objective of the optical system within a housing 12a (Fig. 4). Between the objective housing 12a and the projection opening 11 is mounted a substantially self-contained film supporting and guiding unit 13.

According to the invention, the unit 13 includes a frame structure 14, preferably in the form of an elongated, rectangular box-like sheet metal shell secured as by means of bolts 15 edgewise against the housing 10 over the projection opening 11. Disposed in front of a projection opening 17 in the frame shell is a film gate structure 18, and located below this projection opening 17 is a film advancing structure 19.

In the use of the projector, the film gate 18 functions to guide a film strip 20 in proper relation to the projection opening 17 for receiving therethrough the usual concentrated projection light beam from an illumination source such as a projection lamp within the housing 10 and the usual condenser lens arrangement of the optical system of the projector. Both the optical system and the lamp and their operation are common knowledge and it is therefore not deemed necessary to illustrate any details thereof.

Within the film gate 18, the film strip 20 is supported in projection position between opposed film gate members such as transparent panels 21 and 22 which may be formed from plate glass. These plates are constructed and arranged to press normally together to hold the film stationary and flat and free from buckling so as to avoid aberration in the projected image. The film gate plate 21 is mounted as a window for the projection opening 17 and is supported by a carirer 23. The latter is preferably in the form of a one piece sheet metal frame, marginally engaging the plate 21 through the medium of similar upper and lower narrow flanges 24 formed in converging diagonal planes and providing, with the adjacent margins of the frame, crotch-like channels for engaging beveled upper and lower edges 25 on the plate (Figs. 2, 3, 6 and 7). After assembly of the plate 21 with the carrier frame 23, either or both of a pair of side retaining flanges 27 on the frame is adapted to be bent into engagement with the respective side edges of the plate. Angular flanges 28 formed at the upper and lower header edges of the frame 23 are arranged to be received slidably and removably within the channels provided by opposed mounting rails 29 which are respectively affixed to the front face of the supporting frame shell 14 horizontally above and below the projection aperture 17. For a more detailed description of the gripper panel mounting and certain important features thereof, reference may be had to my copending application Serial No. 536,723 filed May 22, 1944.

The film gate plate 22 is mounted in identical manner as, but in opposition to, the companion film gate plate 21 and upon a flat preferably vertically rectangular supporting frame panel 30 to form a window for a projection aperture 30a therein. The identity of structural details in the plate mountings is confirmed by use of the same identifying reference numerals.

Resilient, separable film engaging co-operation of the film gate plates 21 and 22 is accomplished by mounting the supporting panel 30 for movement toward and away from the opposing front wall of the supporting frame member 14. Accordingly, the supporting panel 30 is mounted by means of a pair of identical fillister headed stud members 31 in rearwardly spaced relation to a relatively stationary door member 32, of preferably greater vertical and horizontal rectangular dimensions than panel 30. In the present instance the studs 31 have their shanks in endwise abutment against the outer face of the panel 30 on its vertical median line respectively immediately above and below the projection opening 30a, and are preferably removably attached to the plate by means such as respective screws 33 (Fig. 6). The shanks of the stud members 31 adjacent to the stud heads project through and beyond and have sliding engagement with the walls or edges of respective bearing apertures 34 appropriately formed in the door 32. Resilient pressure for normally urging the supporting panel 30 and thereby the film gate plate 22 yieldably and in self-leveling relation toward the companion gate plate 21 is afforded by symmetrically dimensioned and shaped bowed leaf springs 35 (Figs. 1 and 7) which are centrally apertured to be received about the respective shanks of the studs 31. The springs 35 shoulder against the door 32 and have their end portions formed as arcuate pads bearing against the respective corner areas of the panel 30. Thus separation of the gate plate 22 from the companion gate plate 21, can be effected by compressing the leaf springs 35 to retract the panel 30 toward the door 32.

A simple and highly effective expedient for retracting the gate-supporting panel 30 in opposition to the springs 35 comprises a camming plate 37 adapted to act upon respective cam surfaces 38 formed on the stud members 31. For simplicity in manufacture and operation, each of the cam surfaces 38 is preferably a frusto-conical intermediate portion of the associated stud shank, tapering from a cylindrical bearing shoulder 39 toward a reduced diameter stem portion 40. An angle of approximately 45° taper in the cams 38 has been found satisfactory. The bearing shoulder 39 is of a length approximating the thickness of the door panel 32 so that in the fully projected condition of the stud 31 the inner face of its head bears directly against the outer face of the door. The bases of the cam surfaces 38 slope away from approximately the inner face plane of the door so that the surfaces are immediately engageable by the camming edges defined by apertures 41 in the camming plate 37 respectively normally concentric with and of equal diameter to the bearing apertures 34. As a result, sliding movement of the camming plate 37 in its plane along the inner face of the door 32 causes the respective camming edges about the apertures 41 to bear against the cams 38 and cam the studs 31 outwardly, thereby retracting the supporting panel 30 and separating the gate plate 22 from the opposing plate 21 or the interposed film 20 and compressing the springs 35. Herein the camming plate 30 is guided for vertical sliding movement by means such as vertical Z-bar guides 42 secured to the inside face of the door 32. The camming plate 37 is, of course, formed with a projection opening 37a corresponding to and registering with the projection openings in the supporting panel 30 and a similar opening 32a in the door 32.

Actuation of the camming plate 37 is preferably effected by means of a lever 43 which, in the present instance, may be formed as a relatively rigid elongated flat sheet metal strip pivotally secured as by means of a screw 44 (Figs. 1 and 8) flatwise against the inside face of the door 34 immediately under the lower edge of the plate 37. The arrangement is such that plate-shifting leverage is applied on substantially the median line of the plate 30 vertically intersecting the axes of the studs 31. Accordingly, one lower corner portion of the plate 37 is trimmed back as at 45 to afford working clearance for the lever 43 and provide a leverage point 46 against which the upper edge of the lever can work in applying plate-shifting force in as direct and uniform a manner as practicable, free from any appreciable tendency towards skewing. Maximum leverage is attained by having the pivot 44 of the lever 43 disposed but a short distance to the other side of the leverage point 46 from the working clearance 45, while the major reach of the lever extends under the clearance and beyond the adjacent edge of the door 32 to provide a handle extension 47 for convenient engagement to move the lever against the leverage point. A stop 48 under the lever 43 holds it in at rest position preferably horizontally and close to the leverage point 46 or in contact therewith depending upon the preferred adjustment of the various co-operating parts.

Upon release of the lever 43 after a gripper-releasing action, the camming plate 37 is returned to initial position automatically by reverse camming action of the cam surfaces 38 against the camming edges about the apertures 37 under the influence of the released energy of the spring 35. Thus, coincident with return of the actuating lever 43 to or toward the at rest position, there is corresponding return of the film-gripping plate 22 toward gripping relation with the companion gripper plate 21.

Longitudinal guidance for the film strip 20 through the film gate is provided at the lead-in or top section of the gate by a U-shaped bracket 49 secured to the upper margin of the outer front face of the frame shell 14. This bracket has forwardly extending side arms 50 co-operatively extending adjacent to the opposite ends of a set of film-guiding rollers 51 mounted by means of a U-bracket 52 upon the upper inner margin of the door 32.

At the trailing or lower section of the film gate a film shoe 53 is mounted along the lower edge of the supporting panel 30 to prevent outward bulging of the film. Below the shoe 53, a set of grooved rollers 54 carried by a U-bracket 55 holds the film normally in engagement with a film sprocket 57. For the purposes of standardization both this lower roller-bracket assembly 54—55 and the upper roller-bracket assembly 51—52 are constructed alike. As may be seen in Fig. 6, the bracket 55 is preferably shimmed out from the inner face of the depending lower margin of the door 32 by a spacer 58 to bring the innermost peripheral reach of the rollers 54 into position inwardly of the normal vertical plane of the film strip 20 and slightly under and inwardly of the foremost peripheral point of the sprocket 57. This assures positive engagement of sprocket teeth 59 within the customary marginal sprocket apertures 60 of the film strip.

The film sprocket 57 is carried by a shaft 61 mounted tranversely within the lowermost section of the supporting shell 14 in such relation to the front wall of the shell as to enable projection of the forward portion of the sprocket through a sprocket aperture 62 in the lower portion of the front wall under and vertically aligned with the projection aperture 17. At one end the shaft 61 carries a knob 63 by which it is adapted to be rotated manually for adjusting the framing of a framed image on the film strip 20. At the opposite end, the shaft 61 carries an intermittent film advancing and indexing mechanism including an indexing disc 64 (Fig. 2) and a star wheel member 65 which has four equidistantly spaced arms 67. The indexing disc 64 and the star wheel 65 are preferably assembled together as a self-contained unit mounted on the shaft 61 for rotation relative thereto, but normally held for joint rotation with the shaft by means such as a friction clutch 68. Four equidistantly spaced indexing notches 69 in the indexing disc are adapted for successive reception of an indexing pin 70 carried by a lever 71 which is intermediately pivoted as at 71a upon the adjacent side wall of the frame 14 and adapted to be periodically actuated to release the pin 70 from the notch 69 in which engaged.

Release of the indexing lever 71 is effected by a dog 72 (Fig. 1) carried by the inner hub portion of a driven gear 73 mounted on the frame 14, for rotation adjacent to the star wheel 65. Projecting from the outer face of the gear 73 is a driving stud 74 which is so positioned with respect to the lever tripping dog 72 that in the rotation of the gear in the direction indicated by arrow in Fig. 2 the stud becomes effective to engage the arm 67 interposed in its path in a timed sequence with the immediately preceding action of the dog 72 in tripping the lever 71 to release the indexing disc from the indexing pin 70. In the continued rotation of the gear 73 to advance the star wheel 65 and thereby the shaft 61 and the film sprocket 57, and after the dog 72 leaves the lever 71, the indexing pin 70 rides upon the periphery of the indexing disc 64 until the next indexing notch 69 is reached. Thereupon the indexing pin 70 drops into the latter and maintains the film sprocket and shaft assembly locked against movement during the succeeding projection interval. Should it be necessary to adjust the framing of the image, the limited rotation of the sprocket 57 necessary for such purpose may be effected by manual actuation through the medium of the knob 63 as permitted by slipping the friction clutch 68. For a more detailed description of the indexing and intermittent film advancing mechanism reference is made to my co-pending application Serial No. 536,721, filed May 22, 1944, now Patent No 2,425,704, issued August 12, 1947.

Another feature of the invention resides in the means whereby simple and efficient co-ordination is effected in the operation of the film-gripping means of the film gate 18 and the intermittent advancing mechanism 19 by utilizing a movable element of the intermittent mechanism. In the present instance, the indexing lever 71 serves this purpose by operating the actuating lever 43. Accordingly, the indexing lever 71 is extended forwardly so that its forward end portion engagingly underlies the outwardly projecting lever extension 47. Therefore, when the lever 71 is tripped in the course of releasing the indexing pin 70, the lever 43 is driven upwardly to operate the camming plate 37 and retract the gripper plate 22, as previously described. This releases the film 20 for advancing movement by the sprocket 57 in the continued operation of the advancing mechanism. The length of the lever 71 from its pivot 71a to engagement with the actuating lever 43 is so proportioned with respect to the point at which the indexing pin 70 is located that although only a relatively slight arc of movement is required to release the indexing pin 70 from one of the notches 69, the arc described by the lever 71 where it contacts the lever 43 will be several times as wide and thus fully adequate for the purpose.

Positive return of the lever 71 to initial indexing position is assured by biasing means such as a spring 75 hooked into an aperture 77 in a right angular flange 78 formed at the forward end of the lever 71. This flange holds the spring 75 clear of the wall panel 12 and also reinforces the lever.

In order to enable threading of the film 20 into place in the film gate 18, the door 32 is preferably hingedly mounted so that it may be opened as indicated in Fig. 5. For this purpose the door 32 has, adjacent to its edge nearest the wall panel 12, similar forwardly projecting upper and lower horizontal hinge ears 79, co-operating with supporting horizontal hinge ears 80 projecting forwardly from the frame shell 14. The ears 79 and 80 are co-axially perforated to receive a removable hinge pin 81. For easy removal or replacement, the hinge pin 81 preferably has a digitally engageable handle 82.

The door 32 is normally held closed by a latch which in this instance comprises a latch bar 83 (Figs. 1, 3 and 5) having a suitable bill 84 engageable with a laterally projecting lug 85 on the outer edge of the door and pivotally mounted as by means of a screw 86 upon the adjacent side of the frame shell 14. A torsion spring 87 acts to urge the latch bar normally into latching position. The forward edge of the bill 84 is conveniently cam-edged as at 88 to enable automatic latching co-action with the lug 85 when the door is swung closed.

Upper and lower stop flanges 89 projecting rearwardly from the outer edge of the door 32 are adapted for engagement with the adjacent side margin of the front face of the frame shell 14 to limit closing movement of the door and determine, together with the hinge structure of the door, the proper spaced relationship of the door relative to the front face of the frame shell. Between the flanges 89 is provided an opening 90 which is of ample dimensions to permit withdrawal therethrough of the grippers 21 and 22 by sliding their carrier frames 23 out of the mounting rails 29. Thus room is provided within the film gate for insertion of a slide-carrying adapter (not shown) through the opening 90 and a supplementary clearance 91 in the adjacent edge of the frame 14, when it is desired to convert the machine for use as a magic lantern. The substantially horizontally coplanar, opposed spaced pairs of upper and lower gripper rails 29 may then serve in the capacity of slide-carrier rails.

By reason of the forwardly projecting disposition of the hinge ears 79, the door 34 may be swung fully open when necessary without interference from the adjacent projector wall 12 against which the inner side of the frame shell 14 may be closely positioned (Fig. 5). Upon opening the door, the end of the actuating lever 43 tends to swing away from the operating lever 71. Accordingly, the end of the lever 43 is preferably formed with a right angular outwardly projecting approaching cam flange 92 which will assure proper relocation of the lever 43 with respect to the underlying lever 71 when the door is swung closed.

Magazine structure to accommodate the rolled film strip 20 is preferably carried as part of the self-contained unit supported by the frame 14 and comprises similar upper and lower film chamber members 93 and 94, respectively, formed from appropriately curled-over sheet metal strips. The upper chamber member 93 is secured onto the upper front of the frame 14 behind the bracket 49 and extends upwardly to curl forwardly and provide in the loop thus formed an open-side spool-less loading chamber within which the film roll is retained by a short flange 95. This flange forms part of a bracket secured to the wall 12 and serves as a separable reinforcement for the chamber loop. The lower chamber member 94 is of similar but downwardly extending forwardly curled shape to provide a spool-less film-receiving chamber. To secure the member 94 onto the bottom of the frame 14, a rearwardly extending angular attachment flange 96 is fastened in place by screws 97. A film retaining flange and separable reinforcement member 98 is fastened on the wall 12 adjacent to the loop of the film receiving member 94.

Throughout the construction a paramount consideration has been simplicity of structural detail, ease of assembly or disassembly, low manufacturing cost and highly efficient operation. The various parts have been individually and collectively devised with the aim of permitting appreciable and in many instances unusual manufacturing tolerances so as to enable production by the simplest sort of high speed mass production methods. Thus, aside from a few standard or screw machine parts or wire springs, the bulk of the parts can be die stamped from sheet metal. If, due to the large tolerances allowed, relative adjustments of certain parts are required for proper operation, they can readily be effected during assembly due to the ease of manipulating the sheet metal parts.

While I have illustrated and described a certain preferred embodiment of my invention, it is to be understood that I do not thereby intend to limit my invention to the specific details disclosed but contemplate that many modifications, substitutions, and alternative constructions may be effected without departing from the spirit and scope of the invention as defined in the appended claims.

I claim:

1. In combination in a strip film projector, means for guiding a strip of film in a predetermined path, a pair of transparent panels adapted to press the film strip therebetween and hold it against buckling during projection of a concentrated light beam therethrough, one of said panels being mounted to remain stationary relative to the film, means carrying the second panel including relatively stationary supporting structure and means movable relative to said supporting structure carrying said panel, a plurality of movement guiding members rigid with said carrying means and projecting slidably through the supporting structure, resilient means normally operative between such supporting structure and said panel-carrying means for urging the latter towards said one transparent panel, cam surfaces on said rigid members, and means movably mounted on said supporting structure and engageable with said cam surfaces for selective co-action therewith for urging the rigid members into movement in a direction away from said panels and thus moving the panel-carrying means and thereby the second panel in opposition to said resilient means to effect a separation of such panel relative to the first mentioned panel and thus release the film for movement between the panels.

2. In combination in a strip film projector, a pair of opposed members adapted to receive a strip film therebetween and hold the same flat to prevent buckling thereof during projection, means supporting one of said members for movement relative to the second member for selectively releasing the strip film for advancing movement in changing the framed image to be projected, said means including supporting elements mounted in spaced relation on the median line of said movable member and having cam surfaces, a camming plate guided for reciprocation relative to said supporting means and co-operating with said cam surfaces, said camming plate having a leverage point on said median line, and a lever mounted to coact with said leverage point for moving said camming plate to act upon said cam surfaces and cause the supporting elements to effect retracting movement of said one member away from the second member to release the film.

3. A film gate structure for a strip film projector, comprising, in combination, a supporting frame structure, a transparent panel adapted to receive a light beam therethrough from a projection lamp and providing a backing for a strip film, a door hingedly mounted upon said supporting structure, a second transparent panel supported by said door and adapted when the door is closed to co-operate in opposition to said first mentioned panel to press the film strip against the latter panel, releasable means normally holding the door in closed position but adapted to release the door to be opened for threading the film in place, and means carried by said door for selectively separating said second panel relative to the first mentioned panel to enable shifting of the film strip between the panels while the door is held closed by said releasable means and remains stationary.

4. A construction as defined in claim 3 in which the means for moving the second panel comprises a member slidably mounted on said door between the door and said second panel, and means securing said second panel to the door co-operates with said slidable member in effecting the separating action of the second panel.

5. In combination in a film gate construction, a stationary film gate member engageable with one side of a film strip, a second film gate member engageable with the opposite side of the film strip and cooperating with the stationary film gate member to hold the film strip flat therebetween, a supporting member spaced from and lying parallel to the film gate members, a carrying structure for said second film gate member spaced from said supporting structure, a pair of studs connecting the supporting structure and said carrying structure together adjacent opposite ends of the film gate members and being slidably disposed relative to said supporting structure to permit movement of said carrying structure to carry said second film gate member toward and away from the stationary film gate member, a pair of bow springs having apertured shoulders with said studs extending therethrough, and bearing with their shoulders against the supporting structure and with their end portions against the carrying structure, said bow springs being of such length that said end portions engage the carrying structure adjacent the opposite sides thereof and being tensioned normally to drive against the carrying structure and thereby press it and the second movable member firmly with equalized pressure toward the film strip between the gate members, and means cooperating with said studs operative to urge them in a direction to compress said bow springs and effect separation of the second gate member from the stationary member.

6. In combination in a strip film projector, a frame structure having a projection opening, means for maintaining a film strip flat and stationary in projection relation across said opening including a stationary member carried by said frame structure and an opposingly cooperating movable pressure member, means for supporting said movable pressure member including a plate spaced from said movable member and having a projection opening registering with said projection opening of the frame structure, means connecting said movable pressure member to said plate for movement relative to said plate and to said stationary member, and a movable plate having a projection aperture registering with the aforesaid projection openings and positioned between said supporting plate and said movable pressure member and cooperating with said connecting means upon relative movement for moving said movable pressure member.

7. In combination in a strip film projector, a film gate including opposed structures adapted to receive a film strip therebetween to hold the film strip flat and stationary during projection, one of said structures being movable relative to the other structure for releasing the film strip for shifting movement therebetween, a supporting structure spaced from said movable structure, connecting studs having their ends secured to said movable structure, head portions on said studs including cylindrical shoulders and frusto-conical cam surfaces intermediate said shoulders and the secured ends of the studs, said supporting structure having bearing holes therethrough slidably cooperative with said cylindrical shoulders, and means including a camming plate having camming holes concentric with said bearing holes and reciprocably mounted and adapted to coact with said frusto-conical cam surfaces to actuate said studs to move axially within said bearing holes and thus effect corresponding movement of the movable structure.

8. In combination in a strip film projector including a film gate having pressure elements for holding a film strip in projection position within the gate, one of said elements being movable toward and away from the remaining element, a door plate supported by said frame in spaced relation to said movable element and having uniformly spaced and located studs securing said movable element in operative relation thereto, said studs having cylindrical bearing shoulders of approximately the width of the door plate thickness and frusto-conical cam surfaces sloping away from the inner edges of the bearing shoulders, said door plate having bearing holes therethrough complementary in diameter and slidably cooperating with said bearing shoulders, a camming plate slidably mounted on the inner face of the door plate and having camming holes concentric with said studs and providing camming edges engageable with said cam surfaces in response to reciprocal sliding movement of the cam plate to force the studs outwardly through the bearing holes in the door plate, and resilient means cooperatively related to said studs and acting between said cam plate and said movable pressure member for normally urging said movable member toward film pressing position and drawing said studs inwardly to cam said camming plate towards neutral position.

9. A combination as defined in claim 8 in which the door plate has an actuating lever mounted thereon engageable with the camming plate for driving the camming plate into camming relation with said cam surfaces.

10. In combination in the film gate for a strip film projector, a movable pressure plate, a carrier for the pressure plate, a support spaced from said carrier, means connecting the carrier to the support and including cam surfaces, a camming plate disposed between said support and said carrier and guided for fixed reciprocal movement in such relation to said cam surfaces that when the camming plate is moved in one direction it engages the cam surfaces and causes retraction of the movable pressure plate, one edge of said plate having a fulcrum point, and an actuating lever pivotally mounted at one side of said fulcrum point and extending into engagement with the fulcrum point and substantially beyond one side of the camming plate to present an extending portion to be engaged for activation, and a stop engageable by said lever in its non-operating position and holding the lever in close relation to said fulcrum point.

11. In combination in a strip film projector, means defining a projection aperture, means for intermittently advancing a film strip by framed increments in projection relation to said aperture, a film gate for holding the film flat across said aperture including a releasable gripper member, means for releasing said gripper member including a pivoted actuating lever, indexing structure for said film advancing means including a lever pivotally mounted for engagement with said gripper actuating lever, and means operative as an incident to indexing of the film advancing means for rocking said indexing lever to actuate said gripper-actuating lever and release said movable gate member while the film is being advanced through the gate but permitting said indexing lever to return and release said gripper-actuating lever upon completion of each frame increment of film advance.

12. In a strip film projector construction, a film gate structure including means for releasably gripping a film strip therebetween to hold the strip in projecting position, selectively operable means for actuating said gripping means to release the film for advancing movement through the gate structure, and means for intermittently advancing the film including a frame-by-frame indexing structure, said indexing structure having as an element thereof a lever movable in a given path in the operation of the indexing structure, said lever having a portion in addition to the requirements for indexing purposes, said portion being effective in the movement of the lever to operate said actuating means.

13. A construction as defined in claim 12 in which the lever is fulcrumed adjacent to the point at which it is active for indexing and said additional portion extends freely beyond such point into cooperative relation to the actuating means, and the construction and relationship is such that the lever travels an arc approximately four times as long as the actuating means as at the indexing point.

OTTO R. NEMETH.

REFERENCES CITED

The following references are of record in the file of this patent:

UNITED STATES PATENTS

| Number | Name | Date |
|---|---|---|
| 1,153,341 | Ryan | Sept. 14, 1915 |
| 1,277,558 | Dumars et al. | Sept. 3, 1918 |
| 1,424,457 | Fegraeus | Aug. 1, 1922 |
| 1,692,092 | Oehmichen | Nov. 20, 1928 |
| 1,733,234 | Nistri | Oct. 29, 1929 |
| 1,779,635 | Newman | Oct. 28, 1930 |
| 2,229,454 | Holmes | Jan. 21, 1941 |
| 2,231,765 | Landrock | Feb. 11, 1941 |
| 2,251,077 | Stanton | July 29, 1941 |
| 2,294,585 | Thompson | Sept. 1, 1942 |
| 2,330,709 | Harper et al. | Sept. 28, 1943 |